Inventor
Kaneyoshi Sugawa
By Stevens, Davis, Miller & Mosher
Attorneys

Inventor
Kaneyoshi Sugawa
By Stevens, Davis, Miller & Mosher
Attorneys

Inventor
Kaneyoshi Sugawa
By Stevens, Davis, Miller & Mosher
Attorneys

United States Patent Office 3,319,014
Patented May 9, 1967

3,319,014

TAPE GUIDE ARRANGEMENT FOR USE IN MAGNETIC VIDEO TAPE RECORDING APPARATUS

Kaneyoshi Sugawa, Kawasaki-shi, Japan, assignor to Matsushita Electric Industrial Co., Ltd., Kadoma, Kadomacho, Kitakawachi-gun, Osaka, Japan, a corporation of Japan Filed Nov. 27, 1962, Ser. No. 240,382
Claims priority, application Japan, Nov. 29, 1961, 36/58,536
2 Claims. (Cl. 179—100.2)

The present invention relates to magnetic tape recording and reproducing units and more particularly to tape guide systems for video signal recording and reproducing units of the type employing a magnetic tape as a recording medium.

The processes now commonly employed in recording television images may broadly be divided into two methods. In one method, a suitable cinematographic camera is used to take images formed on the television screen while the other method employs a magnetic tape to record directly thereon electric signals representing television images and the recorded signals when desired are reproduced and sent to a television screen to form visible images on the screen.

The former method has no direct association with the present invention. Detailed description of the present invention, which will be made hereinafter, is thus applicable only to the latter method, in which a magnetic tape is utilized.

Previously, in the process of recording extreme high frequency signals or signals having an extremely wide frequency band such as television signals directly on a magnetic tape as employed in magnetic sound recording, it has been necessary to employ a very high ratio of tape-to-head speed at which the magnetic medium runs over the gap of the recording or reproducing head in order to enable reproduction of the high frequency components of the recorded signals. Thus, the process has involved various difficulties including the need of high operation speed and the complicacy in structure. Among others, there has been a need of employing very large tape reels, which are inconvenient to handle, even in recording a single event on the television program, for example, showing for a quarter hour.

Many attempts have been made to eliminate these difficulties, met in the conventional process. One of the most successful attempts previously made to reduce the speed of tape travel employs a multiple-recording head, which is mechanically driven at high speed transversely of the tape to obtain a required relative speed between the tape and the recording head. The tape is run past the head longitudinally of the tape at a speed of 15 inches per second enabling the signals to be recorded as a series of transverse lines or tracks. This method provides the recording of more or less allowable qualities but requires a precise assemblage of four recording heads on a disc rotatable at the speed of 14,400 r.p.m.

In an improvement of the above process, it has been arranged so that the tape is scanned diagonally by the head. In this case, the tape usually runs making one complete turn about a fixed cylinder, in which a rotary image-recording head is mounted in a manner so that the direction of tape travel is inclined with respect to the cylinder, making it impossible to place both supply and take-up reels in a common plane. Even where the supply and take-up reels are arranged in a common plane, in this case with the cylinder inclined relative to the plane, the tape must be controlled so that it gets into and out of contact with the surface of the cylinder while travelling in direction axial thereof.

In view of the above difficulties met in the prior art, the present invention has for its primary object to provide an improved tape guide system for a wide-band video tape recording and reproducing unit which comprises a rotary head including a number of magnetic transducers.

Another object of the present invention is to provide a unit of the character described which is arranged so that the magnetic tape travels along a spiral path to enable rotary magnetic transducers to traverse diagonally across the magnetic tape for rectilinear sweeping thereof and which includes means for properly converting the tape movement, which is rectilinear except along the spiral path, so as to allow the tape to smoothly proceed into and out of the spiral path.

A further object of the invention is to provide a unit of the character described having a tape guide system which is comprised of a tape guide member having a rotary head mounted on an axis inclined to the base plate and correcting means including first idlers each having an axis parallel to said rotary head, second idlers each having an axis at right angles to the base plate, and corrective posts each interposed between the first and second idlers.

A still further object of the invention is to provide a unit of the character described having means including corrective posts for converting the tape travel from a rectilinear movement into the spiral movement across the tape guide member and from such spiral movement into another rectilinear movement in the same plane as the first-mentioned rectilinear movement.

A further object of the invention is to provide a unit of the character described in which the corrective posts are provided with means for fixing the posts in a predetermined position and at a predetermined angle of inclination relative to the base plate, and means for allowing the posts to be adjusted within predetermined limits with respect to their position and angle of inclination.

Other objects, features and advantages will become apparent from the following detailed description when taken in conjunction with the accompanying drawings, in which.

Figure 1:
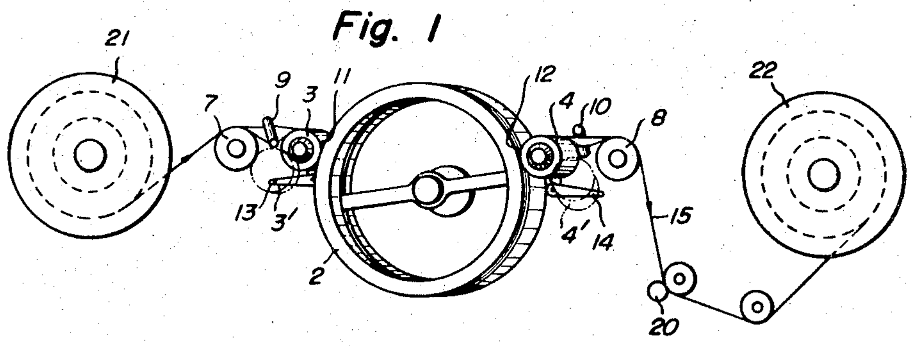
FIG. 1 is a diagrammatic plan view of a wide-band video recording and reproducing unit having a tape guide system embodying the present invention.

In the drawings, there are shown several forms of wide-band video recording and reproducing unit each including a simple and compact tape guide system, which is easy to maintain and which includes correcting mechanisms each utilizing a corrective post for converting the direction of travel of the magnetic tape.

For better understanding of the unit according to the present invention, the conventional process referred to hereinbefore in some detail will now be described in further detail.

Figure 7:
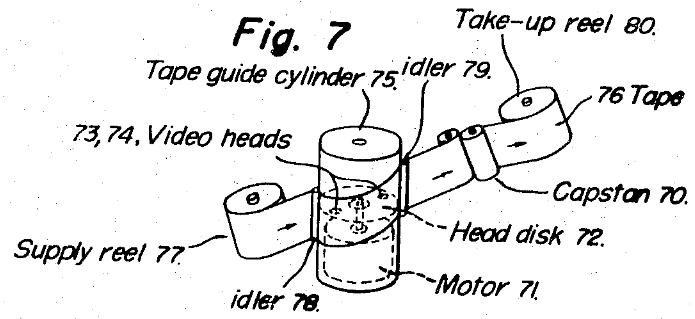
FIG. 7 is an explanatory view of a conventional wide-band video recording and reproducing unit having a guide system in which the tape travels along a spiral path.

The conventional process referred to above may be performed in several manners. A typical procedure is as follows. The procedure, in which the tape is scanned obliquely by the head, is described in detail in the December 1960 issue of the Journal of the SMPTE, pages 868–871. Only the outline of the method by which the tape is guided according to the procedure will be given below with reference to FIG. 7. A video disc 72 accommodating two video heads 73, 74 is driven by a synchronous motor 71 at the speed of 1800 r.p.m., these components being all housed in a tape guide cylinder 75. The tips of the video heads 73, 74 project outwardly beyond the surface of the tape guide cylinder 75 for rotation about the periphery thereof. A magnetic tape 76 is paid out from the supply reel 77 and passing over a first idler 78 makes half a turn about the tape guide cylinder 75 in contact therewith to reach a second idler 79, over which the tape proceeds to pass through a capstan drive 70 to be wound about a take-up reel 80. During the time when the tape 76 travels making half a turn about the tape guide cylinder 75, the two video heads 73, 74 arranged on the rotary head disc in diametrally opposite relation to each other sweep rectilinearly over the tape to record television signals thereon.

In this method, the tape usually runs diagonally or rather spirally along the peripheral surface of the tape guide cylinder, necessitating the arrangement of the supply reel in a level lower than the take-up reel as described hereinbefore. The two reels thus can never be located in a common plane. To remedy this inconvenience, a proposal has been made to have the tape guide cylinder inclined so that the two reels may be located in a common plane. With such arrangement, however, it is necessary that the tape is controlled to get into and out of contact with the tape guide cylinder at right angles to the surface thereof proceeding in a plane including the axis of the cylinder. The points on the cylinder surface where the tape gets into and out of contact with the surface are necessarily axially displaced away from each other. Therefore, the tape cannot be accurately positioned relative to the cylinder simply by stretching it between the two reels. Thus, there remains a drawback that the tape position must be corrected by giving a pull to the tape in an oblique direction.

Figure 10:
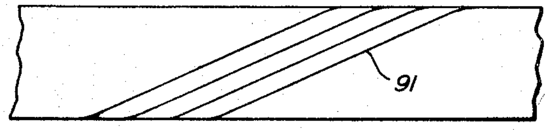
FIG. 10 is a fragmentary view of a magnetic tape carrying recording tracks formed thereon on the unit shown in FIG. 8.
Figures 8, 9:
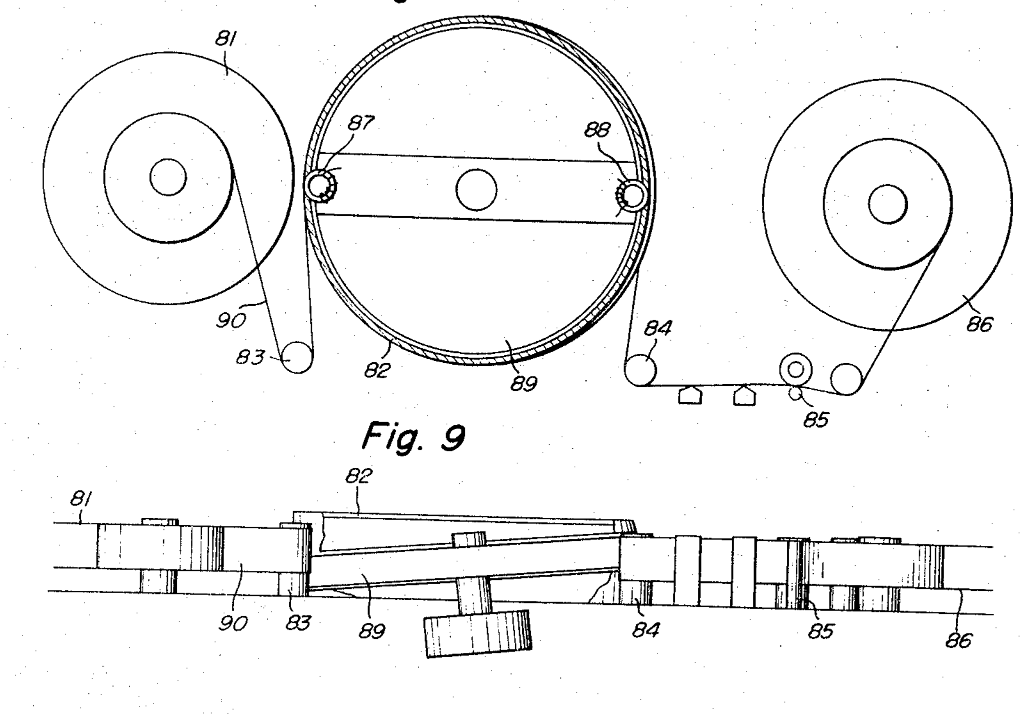
FIG. 8 is a diagrammatic plan view of a conventional wide-band image signal recording and reproducing unit having a guide system in which the tape travels in a horizontal path.
FIG. 9 is a front elevation, partly in section, of the arrangement shown in FIG. 8.

Another proposal made for improving the process has been to arrange so that the tape is run in a horizontal direction with the tape guide cylinder inclined thereto as illustrated in FIG. 8 and FIG. 9. In this case, as will readily be understood, the tape can proceed, without being hindered in any way, from the supply reel 81 through the tape guide 82, two idlers 83, 84 and capstan 85 to the takeup reel 86. Two video heads 87, 88 are mounted in a rotary head disc 89 to sweep the tape 90. One of serious deficiencies of this arrangement is that tracks 91 on the tape each shaped as an elongated sloped S closely collect together along the opposite edges of the tape interfering with each other to cause cross talking, thus making it impossible to record and reproduce continuing signals, as will readily be seen in FIG. 10.

The present invention is designed to eliminate these deficiencies and provides a wide-band video signal recording and reproducing unit having a compact and simplified tape guide system, as will be detailed below.

Figure 2:
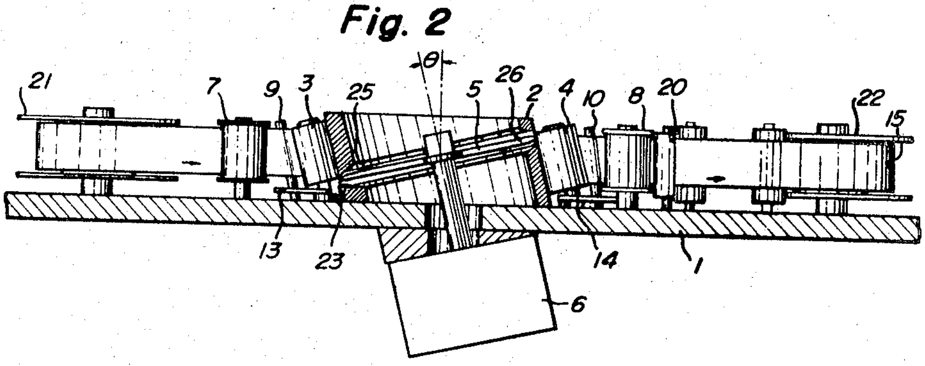
FIG. 2 is a fragmentary front elevation, partly in section, of the unit shown in FIG. 1.

Referring to FIGS. 1 and 2, which illustrate one preferred embodiment of the invention, numeral 1 designates a base plate commonly referred to as a tape-transport panel. A tape guide 2 is cylindrical in shape and is formed with a slot 23 through which project the tips of two magnetic heads 25, 26 mounted on a rotary head drum 5 along its periphery. As shown, the axis of the cylindrical tape guide 2 is inclined to the normal to the base plate at an angle, $\theta$. Accordingly, also arranged at the angle of inclination, $\theta$, to the normal to the base plate 1 are the components housed in the tape guide 2 coaxially therewith, including rotary head drum 5 and drive motor 6 therefor. A magnetic tape 15 is drawn out of supply reel 21 to proceed through a correcting mechanism, which includes a so-called second idler roller 7 having an axis at right angles to the base plate 1, a corrector post 9 inclined to the normal to the base plate 1 at an angle suitable for correction and a so-called first idler roller 3, which has an axis parallel to the axis of the tape guide 2 and serves to direct the tape onto the tape guide 2. The tape thus directed onto the tape guide 2 at its inlet end 11 leaves the guide 2 at its outlet end 12 after the recording or reproduction has been effected on the tape by means of the magnetic heads 25 and 26. The tape then leaves the tape guide 2 at its outlet end 12 to pass over another correcting mechanism, which includes a first idler 4, a corrector post 10 inclined oppositely to corrector post 9, and a second idler 8. Finally, the tape proceeds through the capstan 20 to be wound about the take-up reel 22.

Figure 3:
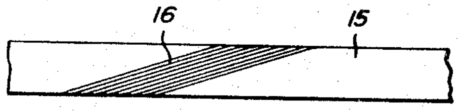
FIG. 3 is a fragmentary view of a magnetic tape showing recording tracks formed thereon on a wide-band video recording and reproducing unit having a tape guide system according to the present invention.

As described above, first idlers 3, 4 are arranged closely adjacent to the ends 11, 12 of the tape guide 2 and second idlers 7, 8 are arranged at a predetermined distance from the respective first idlers with the corrector posts 9, 10 each located substantially intermediate the first and second idlers associated therewith. The tape guide 2, first and second idlers 3, 4 and 7, 8, and corrective posts 9, 10 are all arranged on the base plate 1 substantially in alignment with each other and at substantially the same level. The inlet and outlet ends 11, 12 of the tape guide 2 are recessed to allow the tips of the respective magnetic heads 25 and 26 to make close contact with the first idlers 3, 4 by way of the thickness of the tape. The first idlers are thus partially embedded in the ends 11 and 12 of the tape guide 2. As a result, the tape 15 travels over the tape guide 2 completely covering the effective recording passage thereon so that perfect recording tracks 16 are formed on the tape by magnetic heads 25 and 26, as illustrated in FIG. 3.

The first idlers 3, 4 are arranged practically in contact with the tape guide 2 as described above and might cause inconvenience to the threading and removal of a magnetic tape. In this arrangement, however, snap devices 13 and 14 are provided to avoid such inconvenience. For the threading or removal of the tape, the snap devices are released by manual or other suitable means. The first idlers 3, 4 being mounted on the base plate 1 by way of the respective snap devices 13, 14 are displaced upon releasing the snap devices to the dotted-line position 3′ or 4′ clear of the tape guide 2 thereby to facilitate the threading and removal of the tape.

The operation of this unit will next be described.

The magnetic tape 15 is paid out from the supply reel 21 to proceed in a horizontal plane parallel to the surface of the base plate 1 and including the medial line joining the supply reel 21 and take-up reel 22, as indicated by the broken line in FIG. 2. The tape first reaches the first correcting mechanism, which includes second idler 7, corrective post 9 and first idler 3 and is operable to give rise to a suitable spiral motion of the tape preparatory to its transfer onto the inclined cylindrical tape guide 2. The spiral motion of the tape is reconverted into a rectilinear motion, upon completion of the tape recording or reproduction of the electric signals on the tape guide 2, by another correcting mechanism as described hereinbefore. The tape then passes through the capstan mechanism 20 and finally is wound about the take-up reel 22.

The tape movement on and in the vicinity of the tape guide 2 will be described in more detail. As described, the tape 15 proceeds over the surface of the cylindrical tape guide 2, which is arranged on the base plate 1 with its axis inclined to the normal to the base plate at an angle of inclination, $\theta$. The rotary head drum 5 is mounted in the tape guide 2 coaxially therewith and carries two magnetic rotary video recording heads 25 and 26. Since the tape 15 travels over the tape guide diagonally thereof, some device is required to include the lines of tape travel extending to and from the tape guide in a common plane. According to the present invention, the device is comprised of two sets of guide elements arranged adjacent to the opposite ends 11, 12 of tape guide 2, each including a pair of idlers 3, 7 or 4, 8, and a corrective post 9 or 10. With this arrangement, a tape path is obtained which generally extends in a single plane parallel to the base plate 1. The corrective posts 9 and 10 are held at a suitable angle to the normal to the base plate 1 to take up the tape slack, which might otherwise occur in the upper half width of the tape on the inlet side of the tape guide 2 and in the lower half width of the tape on the outlet side thereof, thereby to allow the tape to travel smoothly. During the travel of the tape over the tape guide 2, the tape is not subjected to any undue diagonal or transverse forces, as the tape is guided along the spiral path on the guide cylinder 2 without any constraints acting on the tape. The path of tape travel on the tape guide, as observed in FIG. 2, is sinusoidal undulating with a limited amplitude along the straight line joining the supply and take-up reels 21, 22 as a line of reference. Thus, the line of tape travel intersects the reference line, which corresponds to the broken line in FIG. 2, at the tape inlet and outlet ends of the tape guide 2 and at a point intermediate the ends. The arrangement of the correcting mechanisms each including a corrective post for conversion between the spiral and rectilinear tape movements adjacent to the tape inlet and outlet ends of the tape guide is to minimize the deviation of the tape path intersecting the reference line therefrom.

It will be appreciated from the foregoing that with the arrangement of simple correcting mechanisms according to the present invention the conversion between the rectilinear and spiral movements of the tape is effectively obtained allowing the tape to travel from the supply reel to the take-up reel without being subjected to any constraint. It will be understood that the tape position on the tape guide 2 may be controlled easily without imposing any stress upon the tape, for example, by the provision of a guide recess on the tape guide. This eliminates the danger of tape misalignment otherwise occurring during reproduction because of the tape strain and thus makes it possible to obtain a wide-band video recording and reproducing unit having an improved electric performance. Also, the arrangement of the idlers, tape guide, as well as supply and take-up reels on the base plate 1 at substantially the same level reduces the height of the entire assemblage including the tape guide and drive systems, enabling the wide-band video recording and reproducing unit to be made compact and simplified.

Having described the basic principles of the magnetic tape recording and reproducing unit of the present invention, specific description will now be made in connection with the embodiment of the invention illustrated in FIGS. 1 to 3.

Figure 4:
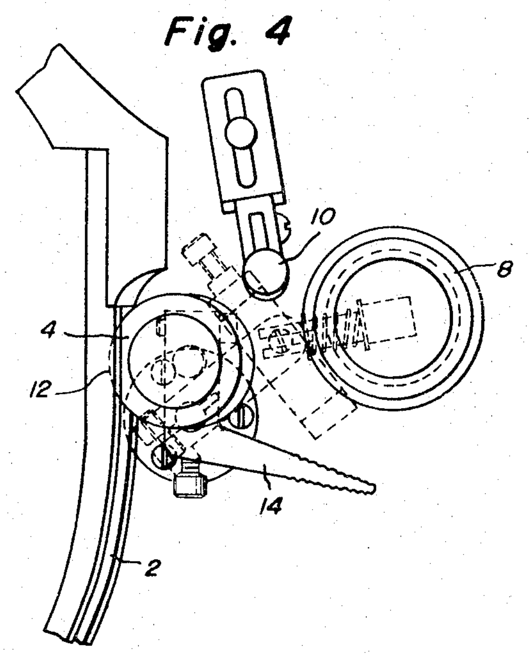
FIG. 4 is a plan view of the correcting mechanism of the tape guide system of the invention including a corrective post.
Figure 5:
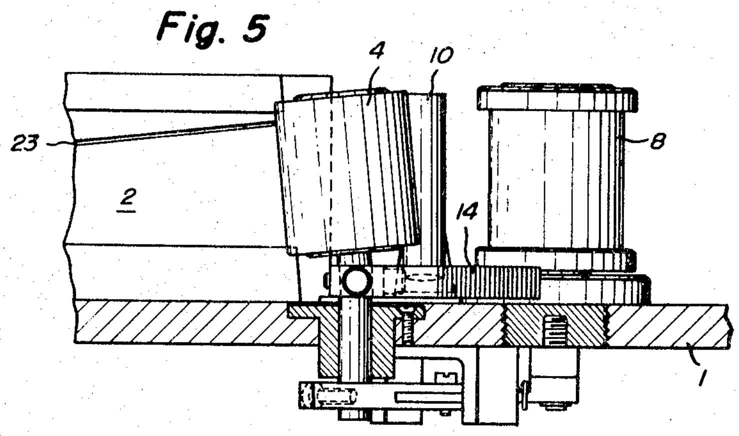
FIG. 5 is a cross-sectional front elevation showing a portion of the mechanism shown in FIG. 4.

One preferred form of the correcting mechanism, which forms the most important part of the invention, is illustrated in detail in FIGS. 4 and 5. At first, respective elements forming the tape guide system according to the present invention will be described with reference to the drawings.

The motor 6 employed in the illustrated embodiment is of the 4-pole hysteresis synchronance type and is designed to rotate at the speed of 1800 r.p.m. when supplied from a commercial source of 60 cycles and 117 volts. The shaft of the motor 6 is inclined to the normal to the base plate at an angle of approximately 5° 21′ and carries a rotary head drum 5 of 220 mm. diameter. Mounted on the drum 5 along its peripheral edge are two magnetic heads 25 and 26, the tip of each of which heads has a thickness of 250 $\mu$m. and a gap of 2.5 $\mu$m. The heads are driven from the motor 6 by way of the head drum 5 to rotate at the peripheral speed of 20 meters per second. Magnetic tape 15, so-called video tape, have a width of one inch and a thickness of 37.5 $\mu$m. Capstan mechanism 20 is provided to drive the tape 15 at a speed of 15 inches per second thereby to form straight diagonal record tracks on the tape. The tracks each having a width of 250 $\mu$m. and a length of approximately 353 mm. are spaced from each other by a distance of 125 $\mu$m.

Figure 6:
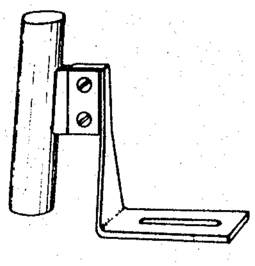
FIG. 6 is a perspective view of the device for adjusting the position and angle of inclination of the corrective post.

The correcting mechanism for converting the movement of the magnetic tape 15 includes a first idler having a diameter of 25 mm. and a length of 29 mm., and a second idler of 25 mm. diameter and 34 mm. length having a tape guide recess of 25.4 mm. width. This mechanism also includes a corrective post of 8 mm. diameter and 34 mm. length. The post is shown in FIG. 5 as of the fixed type but it may be secured to an adjusting device, for example, as shown in FIG. 6 so that the position as well as the angle of inclination of the post may be adjusted within predetermined limits, as will readily be understood.

In operation of the correcting mechanism, the magnetic tape 15 proceeds over the surface of the cylindrical tape guide member 2 along a spiral path thereon. The path of tape travel intersects the reference line joining the supply and take-up reels at a point medial of the tape guide 2 and at the tape inlet and outlet ends thereof, which are each angularly spaced from the medial point a quarter turn around the guide cylinder. In practice, however, in order to obtain a continuous recording, it is arranged so that at opposite ends of each record track the recording is made in overlapping relation to the end of the next preceding or following track. In other words, the recording is made in excess at opposite ends of the tracks over a length of approximately 10 mm. or an angular distance of approximately five degrees across the surface of the tape guide cylinder 2. In addition, as will readily be seen from FIG. 4, the tape must make about a quarter turn about the first idler 4 after it has left the guide cylinder 2 and before the tape movement has been converted by the correcting mechanism. The excess spiral movement thus required of the tape at the opposite ends of the tape guide occurs over a distance of approximately 30 mm. This tends to raise or lower the medial line of the tape relative to the reference line approximately one millimeter. This deviation results in a slack of the upper or lower half width of the tape as pointed out hereinbefore. To eliminate such tape slack, the second idlers 7, 8 are each arranged at a spacing of 39 mm. from the associated first idler 3 or 4 as measured between the points where the first and second idlers are fixed to the base plate. The actual distance over which the tape mounted on the first and second idlers must travel therebetween is 41 mm. with the corrective post 9 or 10 arranged midway of the distance at an angle of inclination of approximately 2.5° relative to the normal to the base plate 1.

Having fully described our invention, it is to be understood that we do not wish to be limited to the details set forth, but our invention is of the full scope of the appended claims.

What is claimed is:

1. A wide band magnetic tape video recording unit comprising a tape supply reel; a tape take-up reel; a tape guide; and magnetic tape disposed about said tape supply reel, said tape guide and said tape take-up reel in such a way that said tape defines a portion of a cylinder about said tape guide and the longitudinal center of said tape is disposed on a single plane; a base plate, the cylindrical surface of said tape guide being inclined with respect to said base plate; a rotary disk having a plurality of magnetic heads mounted substantially at the periphery thereof; means for rotating said disk in a plane disposed at an angle to the central axis of said cylindrical portion of said tape guide; said tape guide defining a slot, a portion of which is contiguous to said tape and extending from one point contiguous to one transverse limit of said tape to another point contiguous to the other transverse limit of said tape; said disk being disposed at least partially within said slot for contiguously scanning said tape; means for longitudinally moving said tape from said supply reel to said take-up reel; a first idler arranged in parallel with said cylindrical surface of said tape guide for guiding said tape into contact with said tape guide, a second idler arranged with its shaft at right angles to said base plate, and a correcting post arranged midway between said first idler and said second idler, said correcting post being inclined with respect to said base plate in order to have the conversion of rectilinear movement and spiral movement of said tape performed.

2. A wide band magnetic tape video recording unit comprising a tape supply reel, a tape take-up reel; a tape guide; a magnetic tape disposed about said tape supply reel, said tape guide and said tape take-up reel in such a way that said tape defines a portion of a cylinder about said tape guide and the longitudinal center of said tape is disposed in a single plane, a base plate, the cylindrical surface of said tape guide being inclined with respect to said base plate, a rotary disk having a plurality of magnetic heads mounted substantially at the periphery thereof; means for rotating said disk in a plane disposed at an angle to the central axis of said cylindrical portion of said tape guide, said tape guide defining a slot, a portion of which is contiguous to said tape and extending at least from one point contiguous to one transverse limit of said tape to another point contiguous to the other transverse limit of said tape; said disk being disposed at least partially within said slot for continuously scanning said tape; means for longitudinally moving said tape from said supply reel to said take-up reel, first idler means arranged in parallel with said cylindrical surface of said tape guide for guiding said tape into contact with said tape guide, second idler means arranged at right angles to said base plate, and a correcting post arranged midway between said first and said second idler means, said correcting post having means for adjusting the position and angular inclination thereof.

References Cited by the Examiner

UNITED STATES PATENTS

| | | | |
|---|---|---|---|
| 3,107,280 | 10/1963 | Suetsugu | 179—100.2 |
| 3,159,501 | 12/1964 | Maxey | 178—6.6 |
| 3,207,517 | 9/1965 | Tanigawa et al. | 179—100.2 |

FOREIGN PATENTS

| | | |
|---|---|---|
| 833,278 | 4/1960 | Great Britain. |
| 894,262 | 4/1962 | Great Britain. |

BERNARD KONICK, *Primary Examiner.*

J. BREIMAYER, *Assistant Examiner.*